United States Patent
Li et al.

(10) Patent No.: US 12,307,738 B2
(45) Date of Patent: May 20, 2025

(54) 3D SHAPE MATCHING METHOD AND DEVICE BASED ON 3D LOCAL FEATURE DESCRIPTION USING SGHS

(71) Applicant: SHENZHEN UNIVERSITY, Guangdong (CN)

(72) Inventors: Dong Li, Guangdong (CN); Sheng Ao, Guangdong (CN); Jindong Tian, Guangdong (CN); Yong Tian, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 370 days.

(21) Appl. No.: 17/042,550

(22) PCT Filed: Dec. 9, 2019

(86) PCT No.: PCT/CN2019/124038
§ 371 (c)(1),
(2) Date: Oct. 3, 2022

(87) PCT Pub. No.: WO2021/114027
PCT Pub. Date: Jun. 17, 2021

(65) Prior Publication Data
US 2023/0015645 A1    Jan. 19, 2023

(51) Int. Cl.
*G06V 10/75*    (2022.01)
*G06V 10/26*    (2022.01)
*G06V 20/64*    (2022.01)

(52) U.S. Cl.
CPC ............ *G06V 10/757* (2022.01); *G06V 10/26* (2022.01); *G06V 20/64* (2022.01)

(58) Field of Classification Search
CPC ...... G06V 10/757; G06V 10/26; G06V 20/64; G06V 10/46; G06T 7/00; G06T 17/00; G06T 17/30
See application file for complete search history.

(56) References Cited

FOREIGN PATENT DOCUMENTS

| CN | 105160344 A | 12/2015 |
|---|---|---|
| CN | 106780459 A | 5/2017 |

(Continued)

OTHER PUBLICATIONS

Yang, J., Quan, S., Wang, P. and Zhang, Y., 2019. Evaluating Local Geometric Feature Representations for 3D Rigid Data Matching. arXiv preprint arXiv:1907.00233.*

(Continued)

*Primary Examiner* — Zhitong Chen
(74) *Attorney, Agent, or Firm* — Brooks Kushman P.C.

(57) ABSTRACT

A 3D shape matching method and a 3D shape matching device based on 3D local feature description using SGHs are provided. In the method, the spherical neighborhood of the feature point is not only divided based on space but also divided based on geometry, the spherical neighborhood of the feature point is not only divided based on the radial direction and the azimuth respectively but also divided based on the elevation, and the spherical neighborhood of the feature point is not only divided based on the deviation angle deviating from the z axis but also divided based on the deviation angle deviating from the x axis. When the deviation angle deviating from the z axis of the spherical neighborhood is divided, the deviation angle is divided more densely where it is closer to the positive direction of the z axis.

14 Claims, 5 Drawing Sheets

(A) 3D object (B) 3D local surface (C) construction of local reference frame

(56) References Cited

FOREIGN PATENT DOCUMENTS

| | | | |
|---|---|---|---|
| CN | 107274423 | A | 10/2017 |
| CN | 109215129 | A | 1/2019 |
| CN | 110211163 | A | 9/2019 |
| CN | 110335297 | A | 10/2019 |
| KR | 100927335 | B1 | 11/2009 |

OTHER PUBLICATIONS

Tombari, F., Salti, S. and Di Stefano, L., 2010. Unique signatures of histograms for local surface description. In Computer Vision—ECCV 2010: 11th European Conference on Computer Vision, Heraklion, Crete, Greece, Sep. 5-11, 2010, Proceedings, Part III 11 (pp. 356-369). Springer Berlin Heidelberg.*

International Search Report and Written Opinion of the International Searching Authority, issued in PCT/CN2019/124038, mailed Dec. 9, 2019; ISA/CN.

* cited by examiner (A) 3D object     (B) 3D local surface     (C) construction of local reference frame (A) radial division  (B) azimuth division  (C) first deviation division

3D SHAPE MATCHING METHOD AND DEVICE BASED ON 3D LOCAL FEATURE DESCRIPTION USING SGHS

CROSS REFERENCE TO RELATED APPLICATIONS

This application is a 371 U.S. National Phase of International Application No. PCT/CN2019/124038, filed Dec. 9, 2019. The entire disclosure of the above application is incorporated herein by reference.

TECHNICAL FIELD

The present application relates to the field of 3D shape matching, and particularly to a 3D shape matching method and a 3D shape matching device based on 3D local feature description using SGHs (Spatial Geometry Histograms).

BACKGROUND

With the continuous development of 3D scanning and modeling technologies as well as 3D reconstruction technologies, 3D object recognition has become a research hotspot in the field of computer vision, and it has been widely applied in intelligent surveillance, e-commerce, robots, biomedicine, etc. 3D shape matching, as the most important part of the 3D object recognition, are mainly divided into 3D shape matching methods based on global features and 3D shape matching methods based on local features. Although the 3D shape matching methods based on global features are provided with fast speed, the 3D shape matching methods based on local features are more robust to occlusion and clutter and can make subsequent pose estimation more accurate.

As a key part of the algorithm based on local features, the local 3D feature descriptor is a key point in the 3D computer vision, a principle of which is to encode geometric and/or spatial information within a neighborhood of a point of interest into a high-dimensional vector. In order to maintain the distinction and robustness for occlusion and clutter, many local descriptors have been proposed and extensively studied. These local feature descriptors can be classified into two categories: local feature descriptors based on a LRA (Local Reference Axis) and local feature descriptors based on a LRF (Local Reference Frame). However, the local reference axis only contains a single orientation axis and is usually used to encode geometric properties of a local surface, thus it can only provide information in the radial direction and elevation direction, and this in turn causes insufficient detailed information of the descriptors. On the contrary, the feature descriptors based on the local reference frame can fully encode the spatial distribution and/or geometric information in a support neighborhood by using three orthogonal axes, which not only is provided with rotation invariance but also greatly enhances the discriminability of the 3D feature descriptors.

In the feature description methods based on the local reference axis, descriptiveness and robustness are considered to be the two most important attributes of the 3D local feature descriptors. The feature descriptor is descriptive if it can characterize main information of a local surface, that is, it should provide enough abundant description to distinguish different local surfaces. The feature descriptor is robust if it is insensitive to a lot of interference (for example, noise and grid resolution variation). Therefore, how to design the structure of the descriptor and what parameters of the descriptor to choose has become focuses discussed by various technicians in related fields.

However, there may be some shortcomings about the performances of the existing local feature descriptors, for example, the designed descriptors can only be applied to a specific scene, the descriptiveness of the descriptors is not enough to describe information of all local surfaces, and the accuracy of description will be reduced since the descriptors are sensitive to noise and grid resolution.

SUMMARY

In order to solve the above technical problems, the following technical solutions are proposed by the present application.

According to a first aspect of the present application, a 3D shape matching method based on 3D local feature description using SGHs is proposed, and the method includes:

acquiring a 3D point cloud of a real scene;

acquiring a feature point p of the 3D point cloud of the real scene;

establishing a local reference frame for a spherical neighborhood of the feature point p, wherein an origin of the spherical neighborhood coincides with the feature point p and the spherical neighborhood has a support radius of R, and an origin of the local reference frame coincides with the feature point p and the local reference frame have an orthogonal and normalized x axis, y axis, and z axis;

establishing a 3D local feature descriptor based on the local reference frame to encode spatial information within the spherical neighborhood so as to acquire 3D local surface information within the spherical neighborhood; and matching the 3D local surface information within the spherical neighborhood with 3D local surface information of a target object to perform 3D shape matching;

wherein the step of establishing the 3D local feature descriptor based on the local reference frame to encode spatial information within the spherical neighborhood includes:

dividing the spherical neighborhood into a plurality of radial partitions along a radial direction with the origin of the spherical neighborhood as a center;

dividing the spherical neighborhood into a plurality of azimuth partitions with the z axis as a central axis;

dividing a first angle $\theta z$ between a negative direction of the z axis and a positive direction of the z axis into a plurality of first deviation partitions with the origin of the spherical neighborhood as the center, where $\theta_z = \pi$;

acquiring a 3D point set P within the spherical neighborhood, wherein $P=\{p_i | i=1, 2, 3, \ldots, n\}$, $p_i$ is a neighborhood point within the spherical neighborhood, and n is the number of neighborhood points within the spherical neighborhood;

determining the radial partition where the neighborhood point $p_i$ is located, the azimuth partition where the neighborhood point $p_i$ is located, and the first deviation partition into which a first axial angle $\alpha$ between a normal vector $n_i$ of the neighborhood point $p_i$ and the z axis falls; and generating a corresponding radial distribution histogram, a corresponding azimuth distribution histogram, and a corresponding first deviation distribution histogram respectively for the 3D point set P within the spherical neighborhood to characterize the 3D local surface information within the spherical neighborhood.

In an embodiment, the plurality of first deviation partitions of the spherical neighborhood are non-uniformly divided, and the first deviation angle is divided more densely where it is closer to the positive direction of the z axis.

In an embodiment, the method further includes:
dividing an elevation angle of the spherical neighborhood into a plurality of elevation partitions with the origin of the spherical neighborhood as the center;
determining the elevation partition where the neighborhood point $p_i$ is located; and
generating a corresponding elevation distribution histogram for the 3D point set P within the spherical neighborhood, and characterizing the 3D local surface information within the spherical neighborhood by using the radial distribution histogram, the azimuth distribution histogram, the elevation distribution histogram and the first deviation distribution histogram.

In an embodiment, the method further includes:
dividing a second angle $\theta_x$, formed by using the x axis as a starting axis and using the x axis as an ending axis on a x-p-y plane, into a plurality of second deviation partitions, where $\theta_x=2\pi$;
determining the second deviation partition into which a second axial angle $\beta$ between a projected vector of the normal vector $n_i$ of the neighborhood point $p_i$ on the x-p-y plane and the x axis falls; and
generating a corresponding second deviation distribution histogram for the 3D point set P within the spherical neighborhood, and characterizing the 3D local surface information within the spherical neighborhood by using the radial distribution histogram, the azimuth distribution histogram, the elevation distribution histogram, the first deviation distribution histogram and the second deviation distribution histogram.

In an embodiment, the steps of generating the corresponding histograms include at least one of:
respectively assigning weights $w_1^R$ and $w_2^R$ to contribution values that the neighborhood point $p_i$ contributes to two adjacent radial partitions closest to the neighborhood point $p_i$, accumulating the contribution values that the 3D point set P contributes to each of the radial partitions, and generating the corresponding radial distribution histogram, where $w_1^R \in [0,1]$, $w_2^R \in [0,1]$, $w_1^R + w_2^R = 1$;
respectively assigning weights $w_1^A$ and $w_2^A$ to contribution values that the neighborhood point $p_i$ contributes to two adjacent azimuth partitions closest to the neighborhood point $p_i$, accumulating the contribution values that the 3D point set P contributes to each of the azimuth partitions, and generating the corresponding azimuth distribution histogram, where $w_1^A \in [0,1]$, $w_2^A \in [0,1]$, and $w_1^A + w_2^A = 1$;
respectively assigning weights $w_1^E$ and $w_2^E$ to contribution values that the neighborhood point $p_i$ contributes to two elevation partitions closest to the neighborhood point $p_i$, accumulating the contribution values that the 3D point set P contributes to each of the elevation partitions, and generating the corresponding elevation distribution histogram, where $w_1^E \in [0,1]$ $w_2^E \in [0,1]$, and $w_1^E + w_2^E = 1$;
respectively assigning weights $w_1^\alpha$ and $w_2^\alpha$ to contribution values that the neighborhood point $p_i$ contributes to two adjacent first deviation partitions closest to the neighborhood point $p_i$, accumulating the contribution values that the 3D point set P contributes to each of the first deviation partitions, and generating the corresponding first deviation distribution histogram, where $w_1^\alpha \in [0,1]$ $w_2^\alpha \in [0,1]$, and $w_1^\alpha + w_2^\alpha = 1$;
respectively assigning weights $w_1^\beta$ and $w_1^\beta$ to contribution values that the neighborhood point $p_i$ contributes to two second deviation partitions closest to the neighborhood point $p_i$, accumulating the contribution values that the 3D point set P contributes to each of the second deviation partitions, and generating the corresponding second deviation distribution histogram, where $w_1^\beta \in [0,1]$ $w_2^\beta \in [0,1]$ and $w_1^\beta + w_2^\beta = 1$.

In an embodiment, the weights $w_1^R$ and $w_1^R$ are inversely proportional to distances from the neighboring point $p_i$ to the centroids of the two adjacent radial partitions respectively, the weights $w_1^A$ and $w_2^A$ are inversely proportional to distances from the neighboring point $p_i$ to the centroids of the two adjacent azimuth partitions respectively, the weights $w_1^E$ and $w_2^E$ are inversely proportional to distances from the neighboring point $p_i$ to the centroids of the two adjacent elevation partitions respectively, the weights $w_1^\alpha$ and $w_2^\alpha$ are inversely proportional to distances from the neighboring point $p_i$ to the centroids of the two adjacent first deviation partitions respectively, and the weights $w_1^\beta$ and $w_1^\beta$ are inversely proportional to distances from the neighboring point $p_i$ to the centroids of the two adjacent second deviation partitions respectively.

In the above described method, the 3D point cloud of the real scene may be acquired in real time, and the 3D point cloud of the target object may be pre-stored. That is to say, in the above described method, the 3D local surface information of the 3D point cloud acquired by real-time measurement of the real scene may be matched with the 3D local surface information acquired by calculating the pre-stored 3D point cloud of the target object, so as to realize recognition of a shape matching the model of the target object from the 3D point cloud of the real scene.

According to a second aspect of the present application, a 3D shape matching method based on 3D local feature description using SGHs is proposed, the steps of which is similar to the steps of the above described method, and their difference lies in that the 3D point cloud of the target object is pre-stored and the 3D point cloud of the scene may also be pre-stored after being acquired. That is to say, in this method, the 3D local surface information acquired by calculating the 3D point cloud of the pre-stored target object may be matched with the 3D local surface information acquired by calculating the 3D point cloud of the scene, so as to realize recognition of a shape matching the model of the target object from the 3D point cloud of the scene.

According to a third aspect of the present application, a 3D shape matching device based on 3D local feature description using SGHs is proposed, which includes an acquisition apparatus, a memory and a processor. Among them, the acquisition apparatus is configured to acquire a 3D point cloud of a real scene, a computer program is stored in the memory, and the processor, when executing the computer program, implements the operations of the method described in the first aspect of the present application except for acquiring the 3D point cloud of the real scene.

According to a fourth aspect of the present application, a 3D shape matching device based on 3D local feature description using SGHs is proposed, which includes a memory and a processor. Among them, a computer program is stored in the memory, and the processor, when executing the computer program, implements the methods described in the first aspect or the second aspect of the present application.

The above description is only a summary of the present application, which cannot be used as a basis for evaluating the contribution of the present application to the prior art. For details, please refer to the description of the specific embodiments of the present application.

In the 3D shape matching method and the 3D shape matching device based on 3D local feature description using SGHs in the present application, the spherical neighborhood of the feature point is not only divided based on space, but also divided based on geometry, so that the 3D local surface information can be effectively described; the spherical neighborhood of the feature point is not only divided based on the radial direction and the azimuth respectively, but also divided based on the elevation, so that this three times of spatial division of the spherical neighborhood makes the spatial description of the descriptor more accurate; the spherical neighborhood of the feature point is not only divided based on the deviation angle deviating from the z axis, but also divided based on the deviation angle deviating from the x axis, so that this two times of geometric division of the spherical neighborhood make the geometric description of the descriptor more accurate; moreover, when the deviation angle deviating from the z axis of the spherical neighborhood is divided, since the depths of the same object in the scene may not change dramatically, the normal vectors of the neighborhood points within the spherical neighborhood may not deviate greatly from the z axis, therefore in the preferred embodiment of the present application, the deviation angle is divided more densely where it is closer to the positive direction of the z axis, so that such a special division manner can make the geometric description of the descriptor more accurate. The structure design of the feature descriptor of the present application can be applied to a variety of scenes, and this feature descriptor is provided with excellent descriptiveness for the 3D local surface in the same scene. In addition, in the generation process of the histogram distribution of all neighborhood points within the spherical neighborhood, the weights are assigned to the two adjacent partitions closest to the neighborhood point and then the contribution values are calculated for each of the neighborhood points, such that the feature descriptor is provided with good robustness, thereby the feature descriptor is hardly affected by noise and grid resolution.

DETAILED EMBODIMENTS

In order to make the objections, technical solutions, and advantages of the present application clearer, the present application is further described below in detail with reference to the accompanying drawings and specific embodiments. It should be understood that the specific embodiments described herein are only used to illustrate the present application, and are not used to limit the present application.

Unless otherwise defined, all technical terms and scientific terms used in this specification have the same meanings as commonly understood by those skilled in the art of the present application. The terms used in the specification of the present application are only aimed to describe specific embodiments, but not to limit the present application. The term "and/or" used in this specification includes any and all combinations of one or more related listed items.

In addition, the terms "first", "second", etc. are only used for descriptive purposes, and cannot be understood as indicating or implying the number or relative importance of a technical feature. The specific embodiments of the present application are described below, and the technical features involved in the described different embodiments may be combined with each other as long as they do not conflict with each other.

As is well-known, the 3D point cloud records a surface of a scene or an object in the form of points after scanning the scene or the object, and each of the points is provided with a three-dimensional coordinate. The 3D shape matching is to match a surface of a scene or an object represented by 3D point data with another or more surfaces of scenes or objects represented by 3D point data, so as to further achieve a result of 3D object recognition.

Figure 1:
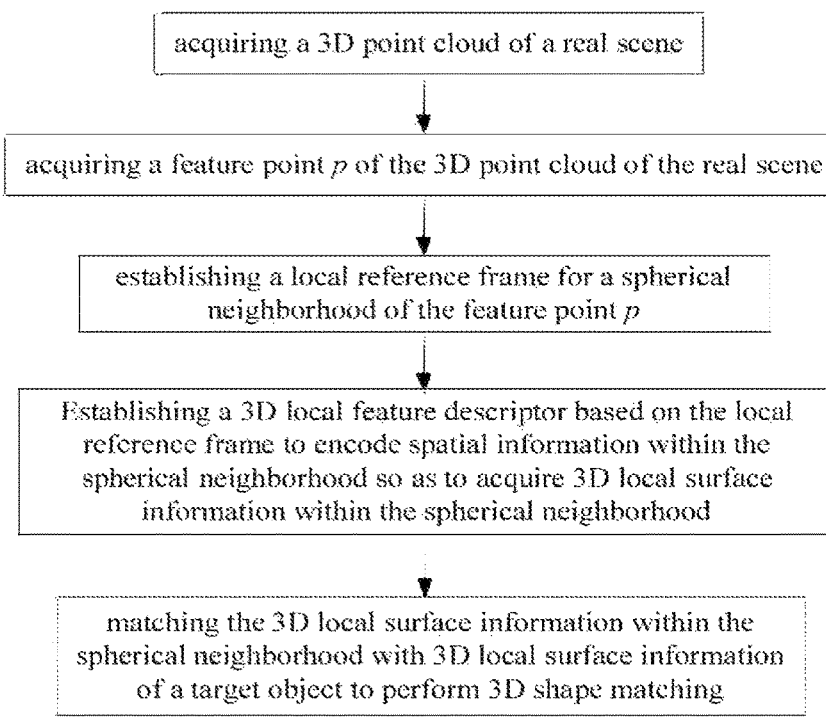
FIG. 1 is a schematic flowchart of the 3D shape matching method based on 3D local feature description with SGHs according to an embodiment.

According to the first aspect of the present application, in an embodiment as shown in FIG. 1, the present application proposes a 3D shape matching method based on 3D local feature description using SGHs, and the method may include:

acquiring a 3D point cloud of a real scene;
acquiring a feature point p of the 3D point cloud of the real scene;
establishing a local reference frame for a spherical neighborhood of the feature point p, here an origin of the spherical neighborhood coincides with the feature point p and the spherical neighborhood has a support radius of R, and an origin of the local reference frame coincides with the feature point p and the local reference frame have an orthogonal and normalized x axis, y axis, and z axis;

establishing a 3D local feature descriptor based on the local reference frame to encode spatial information within the spherical neighborhood so as to acquire 3D local surface information within the spherical neighborhood; and matching the 3D local surface information within the spherical neighborhood with 3D local surface information of a target object to perform 3D shape matching.

In this embodiment, the real scene may be any scene in real life, especially in industrial applications. The present application does not make specific restrictions on the application scene, as long as it is a scene that requires the 3D shape matching or 3D recognition method. In this embodiment, the 3D point cloud may be acquired in real time, and the 3D point cloud of the target object may be pre-stored, i.e., the target object may be a model used to match the same object in the real scene. That is to say, in this embodiment, the 3D local surface information of the 3D point cloud acquired by measuring the real scene in real time can be matched with the 3D local surface information acquired by calculating the 3D point cloud of the pre-stored target object, so as to achieve recognition of a shape matching the model of the target object from the 3D point cloud of the real scene.

In this embodiment, the feature points are also referred to as key points or points of interest, that is, the feature points are provided with a specific shape. The feature points of the 3D point cloud may be acquired by a method based on a fixed-scale or a method based on an adaptive-scale, alternatively the feature points may also be acquired by any other existing technology, which is not limited herein.

Figure 2:
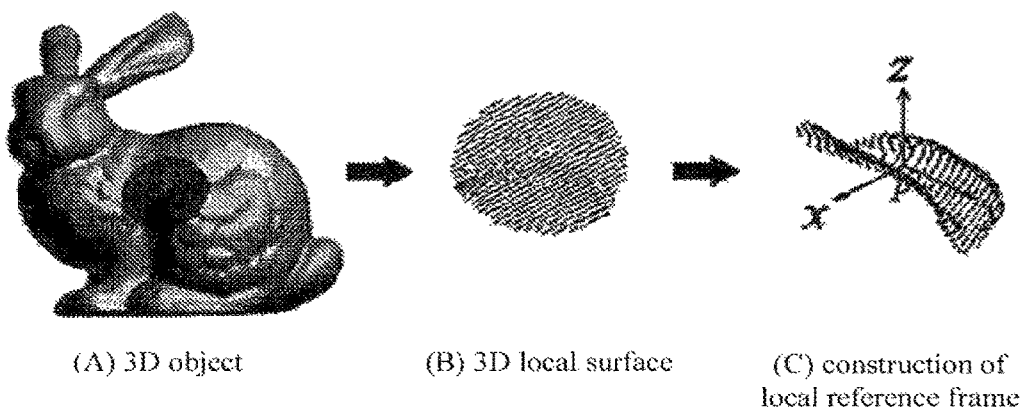
FIG. 2 is a schematic diagram of establishing a local reference frame for a feature point of the 3D point cloud according to an embodiment.
Figure 3:
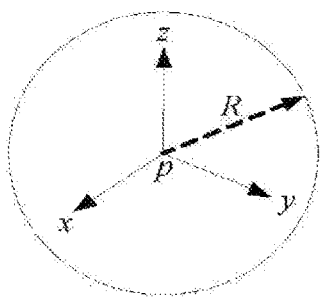
FIG. 3 is a schematic diagram of a spherical neighborhood according to an embodiment.

In an embodiment, as shown in FIGS. 2 and 3, any local reference frame construction method well known to those skilled in the art may be used to construct the local reference frame for the feature points of the 3D point cloud in the present application.

Figure 4:
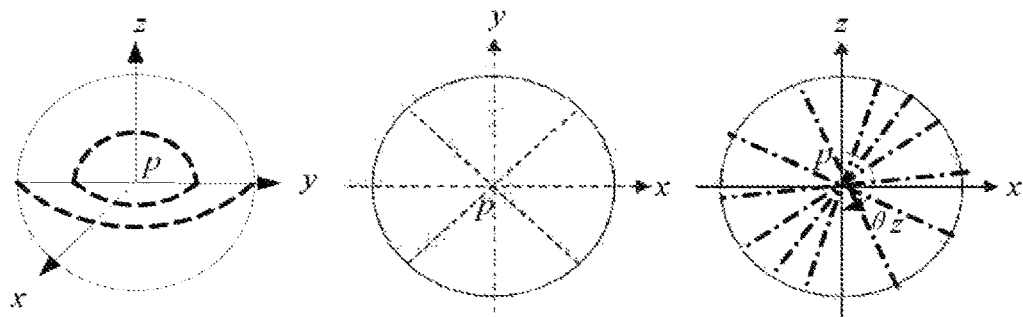
FIG. 4 is a schematic diagram of dividing the spherical neighborhood according to an embodiment.

In an embodiment, as shown in FIG. 4, the step of establishing a 3D local feature descriptor based on the local reference frame to encode spatial information within the spherical neighborhood may include:

dividing the spherical neighborhood into a plurality of radial partitions along a radial direction with the origin of the spherical neighborhood as a center, as shown in FIG. 4A;

dividing the spherical neighborhood into a plurality of azimuth partitions with the z axis as a central axis, as shown in FIG. 4B;

dividing a first deviation angle $\theta_z$ between a negative direction of the z axis and a positive direction of the z axis into a plurality of first deviation partitions with the origin of the spherical neighborhood as the center, as shown in FIG. 4C, where $\theta_z=\pi$;

acquiring a 3D point set P within the spherical neighborhood, where P={$p_i$|I=1, 2, 3, ..., n}, $p_i$ is a neighborhood point within the spherical neighborhood, and n is the number of neighborhood points within the spherical neighborhood;

determining the radial partition where the neighborhood point $p_i$ is located, the azimuth partition where the neighborhood point $p_i$ is located, and the first deviation partition into which a first axial angle $\alpha$ between a normal vector $n_i$ of the neighborhood point $p_i$ and the z axis falls; and generating a corresponding radial distribution histogram, a corresponding azimuth distribution histogram, and a corresponding first deviation distribution histogram respectively for the 3D point set P within the spherical neighborhood to characterize 3D local surface information within the spherical neighborhood.

In this embodiment, the generation of the feature distribution histograms, namely, is to take the partitions as the abscissa and determine the number of neighborhood points included in each of the partitions so as to generate the corresponding statistical histograms, and the data represented by the statistical histograms is used to perform shape matching for the 3D local surface, such that the data and time required for matching can be greatly reduced, thereby simplifying the matching process.

In an embodiment, preferably, the spherical neighborhood may have 4 radial partitions.

In an embodiment, preferably, the spherical neighborhood may have 8 azimuth partitions.

In an embodiment, preferably, the spherical neighborhood may have 4 first deviation partitions.

In an embodiment, the plurality of radial partitions of the spherical neighborhood may be uniformly divided.

In an embodiment, the plurality of radial partitions of the spherical neighborhood may also be non-uniformly divided, which is related to the scene to be measured.

In an embodiment, the plurality of azimuth partitions of the spherical neighborhood may be uniformly divided.

In an embodiment, the plurality of azimuth partitions of the spherical neighborhood may also be non-uniformly divided, which is related to the scene to be measured.

In an embodiment, since the depths of the same object in the scene may not change drastically, then the normal vectors of the neighborhood points within the spherical neighborhood may not deviate greatly away from the z axis. Therefore, the plurality of first deviation partitions may be non-uniformly divided, and the first deviation angle is divided more densely where it is closer to the positive direction of the z axis.

In this embodiment, preferably, since the first deviation angle is required to be divided more densely where it is closer to the positive direction of the z axis, a sine function about $\theta$ may be established, and the amplitude of the sine function may be uniformly divided to realize the non-uniform division of the first angle $\theta_z$, where $\theta \in [0, \theta_z]$.

Figure 5:
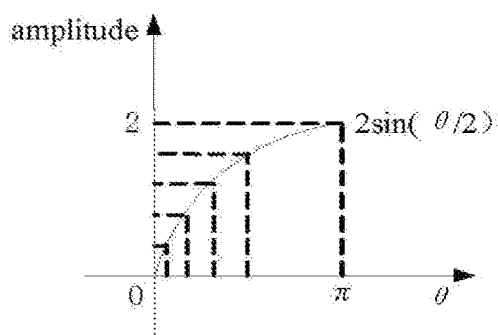
FIG. 5 is a schematic diagram of non-uniform division of the first angle $\theta_z$ according to an embodiment.

In this embodiment as shown in FIG. 5, preferably, the sine function may be determined as $$2\sin\left(\frac{\theta}{2}\right),$$

$\theta \in [0, \theta_z]$.

Figure 6:
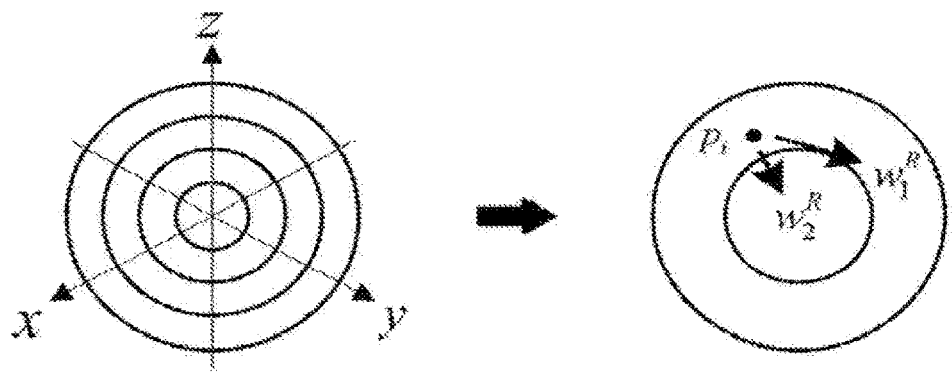
FIG. 6 is a schematic diagram of assigning weight values based on contributions of the neighborhood point $p_i$ to two adjacent radial partitions closest to the neighborhood point $p_i$ respectively according to an embodiment.

In an embodiment, the step of generating the corresponding radial distribution histogram for the 3D point set P within the spherical neighborhood may include:

respectively assigning weights $w_1^R$ and $w_2^R$ to contribution values that the neighborhood point $p_i$ contributes to two adjacent radial partitions closest to the neighborhood point $p_i$ as shown in FIG. 6, where $w_1^R \in [0,1]$, $w_2^R \in [0,1]$, $w_1^R + w_2^R = 1$; and accumulating the contribution values that the 3D point set P contributes to each of the radial partitions, and generating the corresponding radial distribution histogram.

In this embodiment, the "two adjacent radial partitions closest to the neighboring point $p_i$," refer to two adjacent radial partitions whose centroids are closest to the neighboring point $p_i$ among all radial partitions.

In this embodiment, preferably, the weights $w_1^R$ and $w_2^R$ are inversely proportional to distances from the neighboring point $p_i$ to the centroids of the two closest adjacent radial partitions respectively, that is, in the two closest adjacent radial partitions, the contribution value that the neighboring point $p_i$ contributes to this radial partition is smaller if the centroid of the radial partition is farther away from the neighboring point $p_i$. For example, if the neighborhood point $p_i$ is located at the centroid of one of the radial partitions, then the weight $w_1^R$ assigned to the contribution of the neighborhood point $p_i$ to this radial partition is equal to 1, and the weight $w_2^R$ assigned to the contribution of the neighborhood point $p_i$ to another radial partition is equal to 0, correspondingly the contribution value that the neighboring point $p_i$ contributes to this radial partition is equal to 1 and the contribution value that the neighboring point $p_i$ contributes to another radial partition is equal to 0 if a cardinality of the contribution value is equal to 1. For example, if the neighborhood point $p_i$ is a little closer to the centroid of one of the two radial partitions and a little farther away from the centroid of another radial partition, then the weight $w_1^R$ of the contribution of the neighborhood point $p_i$ to the one radial partition may range from 0 to 1 and be greater than $w_2^R$, and correspondingly the contribution value that the neighboring point $p_i$ contributes to the one radial partition will be greater than the contribution value that the neighboring point $p_i$ contributes to another radial partition. For example again, if the neighborhood point $p_i$ is located at an edge of the two closest adjacent radial partitions, i.e., the distances from the neighborhood point $p_i$ to the centroids of the two closest adjacent radial partitions are the same, then each of the weights $w_1^R$ and $w_2^R$ of the contribution of the neighborhood point $p_i$ to the two radial partitions may be equal to 0.5, and correspondingly the contribution values that the neighborhood point $p_i$ contributes to the two radial partitions are also the same, for example, each of the contribution values may be equal to 0.5. Of course, the cardinality of the contribution value may be set arbitrarily according to an actual situation. For example, in order to better distinguish the effect, the cardinality may be set to be greater than 1. In this way, the description for the neighborhood points located at and near the edges of the radial partitions can be effectively improved.

Figure 7:
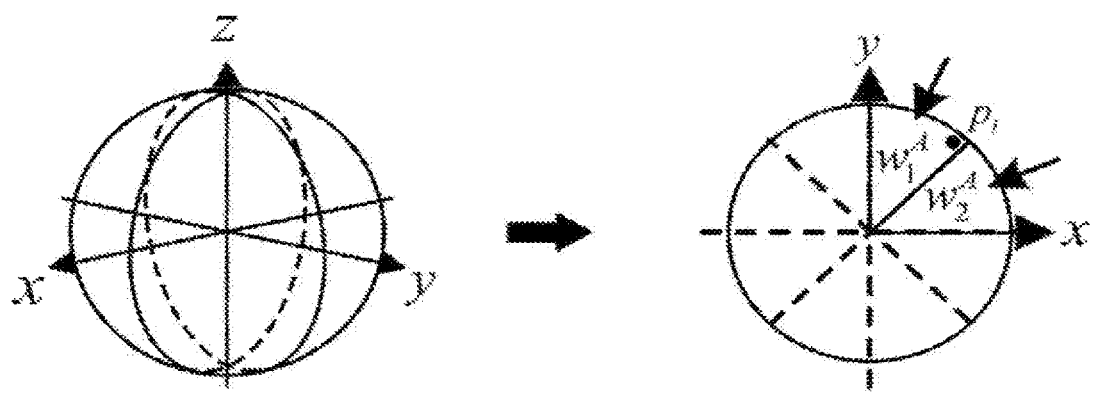
FIG. 7 is a schematic diagram of assigning weight values based on contributions of the neighborhood point $p_i$ to two adjacent azimuth partitions closest to the neighborhood point $p_i$ respectively according to an embodiment.

In an embodiment, the step of generating the corresponding azimuth distribution histogram for the 3D point set P within the spherical neighborhood may include:
respectively assigning weights $w_1^A$ and $w_2^A$ to contribution values that the neighborhood point $p_i$ contributes to two adjacent azimuth partitions closest to the neighborhood point $p_i$ as shown in FIG. 7, where $w_1^A \in [0,1]$, $w_2^A \in [0,1]$, and $w_1^A + w_2^A = 1$; and
accumulating the contribution values that the 3D point set P contributes to each of the azimuth partitions, and generating the corresponding azimuth distribution histogram.

In this embodiment, the "two adjacent azimuth partitions closest to the neighboring point $p_i$," refer to two adjacent azimuth partitions whose centroids are closest to the neighboring point $p_i$ among all azimuth partitions.

In this embodiment, preferably, the weights $w_1^A$ and $w_2^A$ are inversely proportional to distances from the neighboring point $p_i$ to the centroids of the two adjacent azimuth partitions respectively, that is, in the two closest adjacent azimuth partitions, the contribution value that the neighboring point $p_i$ contributes to this azimuth partition is smaller if the centroid of the azimuth partition is farther away from the neighboring point $p_i$. The weights of the azimuth partitions may be set with reference to the foregoing embodiment in which the weights of the radial partitions are set. In this way, the description for the neighboring points located at and near the edges of the azimuth partitions can be effectively improved.

Figure 8:
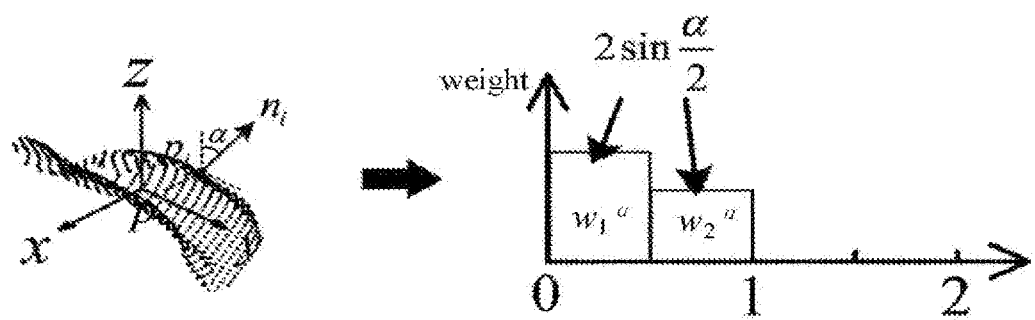
FIG. 8 is a schematic diagram of assigning weight values based on contributions of the neighborhood point $p_i$ to two adjacent first deviation partitions closest to the neighborhood point $p_i$ respectively according to an embodiment.

In an embodiment, the step of generating the corresponding first deviation distribution histogram for the 3D point set P within the spherical neighborhood may include:
respectively assigning weights $w_1^\alpha$ and $w_2^\alpha$ to contribution values that the neighborhood point $p_i$ contributes to two adjacent first deviation partitions closest to the neighborhood point $p_i$ as shown in FIG. 8, where $w_1^\alpha \in [0,1]$ $w_2^\alpha \in [0,1]$, and $w_1^\alpha + w_2^\alpha = 1$; and
accumulating the contribution values that the 3D point set P contributes to each of the first deviation partitions, and generating the corresponding first deviation distribution histogram.

In this embodiment, the "two adjacent first deviation partitions closest to the neighboring point $p_i$," refer to two adjacent first deviation partitions whose centroids are closest to the neighboring point $p_i$ among all first deviation partitions.

In this embodiment, preferably, the weights $w_1^\alpha$ and $w_2^\alpha$ are inversely proportional to distances from the neighboring point $p_i$ to the centroids of the two adjacent first deviation partitions respectively, that is, in the two closest adjacent first deviation partitions, the contribution value that the neighboring point $p_i$ contributes to this first deviation partition is smaller if the centroid of the first deviation partition is farther away from the neighboring point $p_i$. The weights of the first deviation partitions may be set with reference to the foregoing embodiment in which the weights of the radial partitions are set. In this way, the description for the neighboring points located at and near the edges of the first deviation partitions can be effectively improved.

Figure 9:
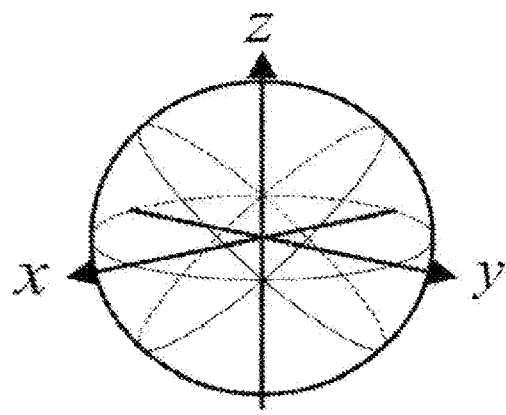
FIG. 9 is a schematic diagram of dividing an elevation angle of the spherical neighborhood into a plurality of elevation partitions according to an embodiment.

In an embodiment, the method includes the basic technical features of the above embodiments, and the method, on the basis of the above embodiments, may further include:
dividing an elevation angle of the spherical neighborhood into a plurality of elevation partitions with the origin of the spherical neighborhood as the center (for example, the y-p-z plane is taken as an example) as shown in FIG. 9;
determining the elevation partition where the neighborhood point $p_i$ is located; and generating a corresponding elevation distribution histogram for the 3D point set P within the spherical neighborhood, and characterizing the 3D local surface information within the spherical neighborhood by using the radial distribution histogram, the azimuth distribution histogram, the elevation distribution histogram and the first deviation distribution histogram.

In an embodiment, preferably, the spherical neighborhood may have 4 elevation partitions.

Figure 10:
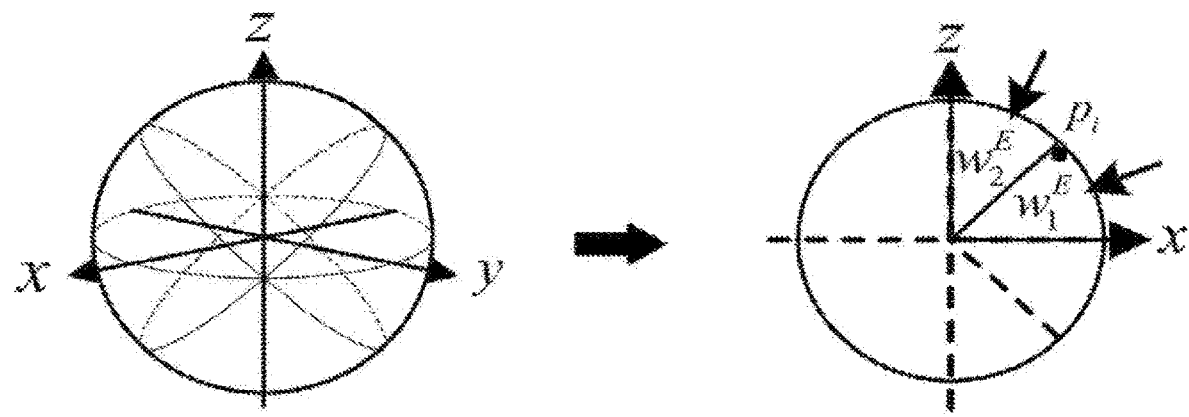
FIG. 10 is a schematic diagram of assigning weight values based on contributions of the neighborhood point $p_i$ to two elevation partitions closest to the neighborhood point $p_i$ respectively according to an embodiment.

In an embodiment, the step of generating the corresponding elevation distribution histogram for the 3D point set P within the spherical neighborhood may include:
respectively assigning weights $w_1^E$ and $w_2^E$ to contribution values that the neighborhood point $p_i$ contributes to two elevation partitions closest to the neighborhood point $p_i$ as shown in FIG. 10, where $w_1^E \in [0,1]$ $w_2^E \in [0,1]$, and $w_1^E + w_2^E = 1$; and accumulating the contribution values that the 3D point set P contributes to each of the elevation partitions, and generating the corresponding elevation distribution histogram.

In this embodiment, the "two adjacent elevation partitions closest to the neighboring point $p_i$" refer to two adjacent elevation partitions whose centroids are closest to the neighboring point $p_i$ among all elevation partitions.

In this embodiment, preferably, the weights $w_1^E$ and $w_2^E$ are inversely proportional to distances from the neighboring point $p_i$ to the centroids of the two adjacent elevation partitions respectively, that is, in the two closest adjacent elevation partitions, the contribution value that the neighboring point $p_i$ contributes to this elevation partition is smaller if the centroid of the elevation partition is farther away from the neighboring point $p_i$. The weights of the elevation partitions may be set with reference to the foregoing embodiment in which the weights of the radial partitions are set. In this way, the description for the neighboring points located at and near the edges of the elevation partitions can be effectively improved.

Figure 11:
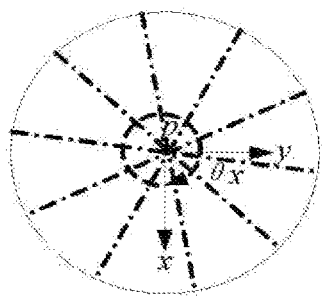
FIG. 11 is a schematic diagram of dividing the x-p-y plane into a plurality of second deviation partitions according to an embodiment.

In an embodiment, the method includes the basic technical features of the above embodiment, and the method, on the basis of the above embodiment, may further include:

dividing a second angle $\theta_x$, formed by using the x axis as a starting axis and using the x axis as an ending axis on the x-p-y plane, into a plurality of second deviation partitions as shown in FIG. 11, where $\theta x=2\pi$;

determining the second deviation partition into which a second axial angle β between a projected vector of the normal vector $n_i$ of the neighborhood point $p_i$ on the x-p-y plane and the x axis falls; and generating a corresponding second deviation distribution histogram for the 3D point set P within the spherical neighborhood, and characterizing the 3D local surface information within the spherical neighborhood by using the radial distribution histogram, the azimuth distribution histogram, the elevation distribution histogram, and the first deviation distribution histogram and the second deviation distribution histogram.

In an embodiment, preferably, the spherical neighborhood has 4 second deviation partitions.

Figure 12:
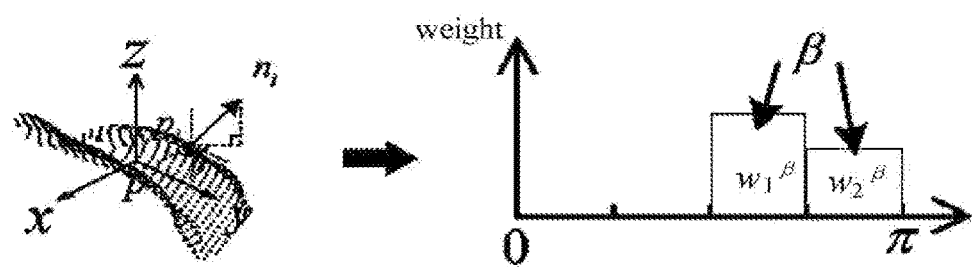
FIG. 12 is a schematic diagram of assigning weight values based on contributions of the neighborhood point $p_i$ to two second deviation partitions closest to the neighborhood point $p_i$ respectively according to an embodiment.

In an embodiment, the step of generating the corresponding second deviation distribution histogram for the 3D point set P within the spherical neighborhood may include:

respectively assigning weights $w_1^\beta$ and $w_2^\beta$ to contribution values that the neighborhood point $p_i$ contributes to two second deviation partitions closest to the neighborhood point $p_i$ as shown in FIG. 12, where $w_1^\beta \in [0,1]$ $w_2^\beta \in [0,1]$ and $w_1^\beta + w_2^\beta = 1$; and accumulating the contribution values that the 3D point set P contributes to each of the second deviation partitions, and generating the corresponding second deviation distribution histogram.

In this embodiment, the "two adjacent second deviation partitions closest to the neighboring point $p_i$" refer to two adjacent second deviation partitions whose centroids are closest to the neighboring point $p_i$ among all second deviation partitions.

In this embodiment, preferably, the weights $w_1^\beta$ and $w_2^\beta$ are inversely proportional to distances from the neighboring point $p_i$ to the centroids of the two adjacent second deviation partitions respectively, that is, in the closest two adjacent second deviation partitions, the contribution value that the neighboring point $p_i$ contributes to this second deviation partition is smaller if the centroid of the second deviation partition is farther away from the neighboring point $p_i$. The weights of the second deviation partitions may be set with reference to the foregoing embodiment in which the weights of the radial partitions are set. In this way, the description for the neighboring points located at and near the edges of the second deviation partitions can be effectively improved.

The second aspect of the present application proposes a 3D shape matching method based on 3D local feature description using SGHs. The steps of the embodiments of the second aspect of the present application is similar to the steps of the above described embodiments of the first aspect, and their difference lies in that the 3D point cloud of the target object may be pre-stored and the 3D point cloud of the scene may also be pre-stored after being acquired. That is to say, in this method, the 3D local surface information acquired by calculating the 3D point cloud of the pre-stored target object may be matched with the 3D local surface information acquired by calculating the 3D point cloud of the scene, so as to realize recognition of a shape matching the model of the target object from the 3D point cloud of the scene. For other technical features of the second aspect of the present application, reference may be made to the technical features in the specific embodiments of the first aspect of the present application, which will not be repeated herein again.

Figure 13:
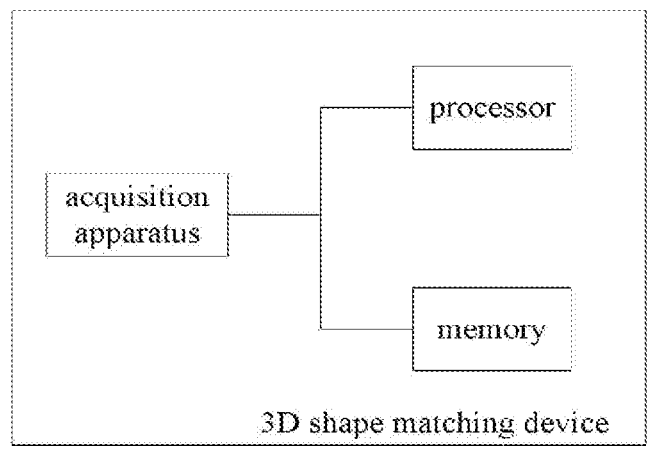
FIG. 13 is a schematic structural diagram of the 3D shape matching device based on 3D local feature description with SGHs according to an embodiment.

According to the third aspect of the present application, in an embodiment as shown in FIG. 13, a 3D shape matching device based on 3D local feature description using SGHs is proposed, which may include an acquisition apparatus, a memory and a processor. Among them, the acquisition apparatus is configured to acquire a 3D point cloud of a real scene, a computer program is stored in the memory, and the processor, when executing the computer program, implements the operations of the embodiments of the method described in the first aspect of the present application except for acquiring the 3D point cloud of the real scene. In this embodiment, the acquisition apparatus may be a 3D scanning apparatus, a laser scanning apparatus, an acquisition apparatus using structured light, or any other apparatus that can acquire the 3D point cloud of the real scene, and the memory may be any storage apparatus with a software storage function, and the processor may be any processor that may execute the computer program and instruct a certain execution subject to perform related operations. In an embodiment, the 3D point cloud data acquired by the acquisition apparatus may be directly or indirectly stored in the memory, or may be accessed by the memory or the processor. In an embodiment, the processor may directly or indirectly control the acquisition apparatus to acquire the 3D point cloud data. For other technical features of the third aspect of the present application, reference may be made to the technical features in the specific embodiments of the first aspect of the present application, which will not be repeated herein again.

According to the fourth aspect of the present application, an embodiment proposes a 3D shape matching device based on 3D local feature description using SGHs, which includes a memory and a processor. Among them, a computer program is stored in the memory, and the processor, when executing the computer program, implements the embodiments of the methods described in the first aspect or the second aspect of the present application. For other technical features of the fourth aspect of the present application, reference may be made to the technical features in the specific embodiments of the first, second or third aspect of the present application, which will not be repeated herein again.

The specific embodiments of the present application described above do not constitute a limitation on the protection scope of the present application. Any amendment, equivalent replacement and improvement made within the principles of the present application shall be included in the protection scope of the present application.

What is claimed is:

1. A 3D shape matching method based on 3D local feature description using SGHs, comprising:
    acquiring a 3D point cloud of a real scene;
    acquiring a feature point p of the 3D point cloud of the real scene;
    establishing a local reference frame for a spherical neighborhood of the feature point p, wherein an origin of the spherical neighborhood coincides with the feature point p and the spherical neighborhood has a support radius of R, and an origin of the local reference frame coincides with the feature point p and the local reference frame have an orthogonal and normalized x axis, y axis, and z axis;
    establishing a 3D local feature descriptor based on the local reference frame to encode spatial information within the spherical neighborhood so as to acquire 3D local surface information within the spherical neighborhood; and
    matching the 3D local surface information within the spherical neighborhood with 3D local surface information of a target object to perform 3D shape matching;
    wherein the step of establishing the 3D local feature descriptor based on the local reference frame to encode spatial information within the spherical neighborhood comprises:
    dividing the spherical neighborhood into a plurality of radial partitions along a radial direction with the origin of the spherical neighborhood as a center;
    dividing the spherical neighborhood into a plurality of azimuth partitions with the z axis as a central axis;
    dividing a first angle $\theta_z$ between a negative direction of the z axis and a positive direction of the z axis into a plurality of first deviation partitions with the origin of the spherical neighborhood as the center, where $\theta_z=\pi$;
    acquiring a 3D point set P within the spherical neighborhood, wherein P={$p_i$|I=1, 2, 3, . . . , n}, $p_i$ is a neighborhood point within the spherical neighborhood, and n is the number of neighborhood points within the spherical neighborhood;
    determining the radial partition where the neighborhood point $p_i$ is located, the azimuth partition where the neighborhood point $p_i$ is located, and the first deviation partition into which a first axial angle $\alpha$ between a normal vector $n_i$ of the neighborhood point $p_i$ and the z axis falls; and
    generating a corresponding radial distribution histogram, a corresponding azimuth distribution histogram, and a corresponding first deviation distribution histogram respectively for the 3D point set P within the spherical neighborhood to characterize the 3D local surface information within the spherical neighborhood,
    wherein the plurality of first deviation partitions of the spherical neighborhood are non-uniformly divided, and the first deviation angle is divided more densely where it is closer to the positive direction of the z axis, and
    wherein the first angle $\theta_z$ is non-uniformly divided through establishing a sine function 2 sin ($\theta/2$) about $\theta$ and dividing amplitude of the sine function non-uniformly, where $\theta \in \}0, \theta_z\}$.

2. The 3D shape matching method according to claim 1, wherein the method further comprises:
    dividing an elevation angle of the spherical neighborhood into a plurality of elevation partitions with the origin of the spherical neighborhood as the center;
    determining the elevation partition where the neighborhood point $p_i$ is located; and
    generating a corresponding elevation distribution histogram for the 3D point set P within the spherical neighborhood, and characterizing the 3D local surface information within the spherical neighborhood by using the radial distribution histogram, the azimuth distribution histogram, the elevation distribution histogram and the first deviation distribution histogram.

3. The 3D shape matching method according to claim 2, wherein the method further comprises:
    dividing a second angle $\theta_x$, formed by using the x axis as a starting axis and using the x axis as an ending axis on a x-p-y plane, into a plurality of second deviation partitions, where $\theta_x=2\pi$;
    determining the second deviation partition into which a second axial angle $\beta$ between a projected vector of the normal vector $n_i$ of the neighborhood point $p_i$ on the x-p-y plane and the x axis falls; and
    generating a corresponding second deviation distribution histogram for the 3D point set P within the spherical neighborhood, and characterizing the 3D local surface information within the spherical neighborhood by using the radial distribution histogram, the azimuth distribution histogram, the elevation distribution histogram, the first deviation distribution histogram and the second deviation distribution histogram.

4. The 3D shape matching method according to claim 3, wherein the steps of generating the corresponding histograms comprise at least one of:
    respectively assigning weights $w_1^R$ and $w_2^R$ to contribution values that the neighborhood point $p_i$ contributes to two adjacent radial partitions closest to the neighborhood point $p_i$, accumulating the contribution values that the 3D point set P contributes to each of the radial partitions, and generating the corresponding radial distribution histogram, where $w_1^R \in [0,1]$, $w_2^R \in [0,1]$, $w_1^R + w_2^R = 1$;
    respectively assigning weights $w_1^A$ and $w_2^A$ to contribution values that the neighborhood point $p_i$ contributes to two adjacent azimuth partitions closest to the neighborhood point $p_i$, accumulating the contribution values that the 3D point set P contributes to each of the azimuth partitions, and generating the corresponding azimuth distribution histogram, where $w_1^A \in [0,1]$, $w_2^A \in [0,1]$, and $w_1^A + w_2^A = 1$;
    respectively assigning weights $w_1^E$ and $w_2^E$ to contribution values that the neighborhood point $p_i$ contributes to two elevation partitions closest to the neighborhood point $p_i$, accumulating the contribution values that the 3D point set P contributes to each of the elevation partitions, and generating the corresponding elevation distribution histogram, where $w_1^E \in [0,1]$ $w_2^E \in [0,1]$, and $w_1^E + w_2^E = 1$;
    respectively assigning weights $w_1^\alpha$ and $w_2^\alpha$ to contribution values that the neighborhood point $p_i$ contributes to two adjacent first deviation partitions closest to the neighborhood point $p_i$, accumulating the contribution values that the 3D point set P contributes to each of the first deviation partitions, and generating the corresponding first deviation distribution histogram, where $w_1^\alpha \in [0,1]$ $w_2^\alpha \in [0,1]$, and $w_1^\alpha + w_2^\alpha = 1$;
    respectively assigning weights $w_1^\beta$ and $w_1^\beta$ to contribution values that the neighborhood point $p_i$ contributes to two second deviation partitions closest to the neighborhood point $p_i$, accumulating the contribution values that the 3D point set P contributes to each of the second deviation partitions, and generating the corresponding second deviation distribution histogram, where $w_1^\beta \in [0,1]$ $w_2^\beta \in [0,1]$ and $w_1^\beta + w_2^\beta = 1$.

5. The 3D shape matching method according to claim 4, wherein the weights $w_1^R$ and $w_2^R$ are inversely proportional to distances from the neighboring point $p_i$ to the centroids of the two adjacent radial partitions respectively, the weights $w_1^A$ and $w_2^A$ are inversely proportional to distances from the neighboring point $p_i$ to the centroids of the two adjacent azimuth partitions respectively, the weights $w_1^E$ and $w_2^E$ are inversely proportional to distances from the neighboring point $p_i$ to the centroids of the two adjacent elevation partitions respectively, the weights $w_1^\alpha$ and $w_2^\alpha$ are inversely proportional to distances from the neighboring point $p_i$ to the centroids of the two adjacent first deviation partitions respectively, and the weights $w_1^\beta$ and $w_2^\beta$ are inversely proportional to distances from the neighboring point $p_i$ to the centroids of the two adjacent second deviation partitions respectively.

6. A 3D shape matching method based on 3D local feature description using SGHs, comprising:
acquiring a 3D point cloud of a target object;
acquiring a feature point p of the 3D point cloud of the target object;
establishing a local reference frame for a spherical neighborhood of the feature point p, wherein an origin of the spherical neighborhood coincides with the feature point p and the spherical neighborhood has a support radius of R, and an origin of the local reference frame coincides with the feature point p and the local reference frame have an orthogonal and normalized x axis, y axis, and z axis;
establishing a 3D local feature descriptor based on the local reference frame to encode spatial information within the spherical neighborhood so as to acquire 3D local surface information within the spherical neighborhood; and
matching the 3D local surface information within the spherical neighborhood with 3D local surface information of a scene to perform 3D shape matching;
wherein the step of establishing the 3D local feature descriptor based on the local reference frame to encode spatial information within the spherical neighborhood comprises:
dividing the spherical neighborhood into a plurality of radial partitions along a radial direction with the origin of the spherical neighborhood as a center;
dividing the spherical neighborhood into a plurality of azimuth partitions with the z axis as a central axis;
dividing a first angle $\theta_z$ between a negative direction of the z axis and a positive direction of the z axis into a plurality of first deviation partitions with the origin of the spherical neighborhood as the center, where $\theta_z = \pi$;
acquiring a 3D point set P within the spherical neighborhood, wherein $P = \{p_i | i = 1, 2, 3, \ldots, n\}$, $p_i$ is a neighborhood point within the spherical neighborhood, and n is the number of neighborhood points within the spherical neighborhood;
determining the radial partition where the neighborhood point $p_i$ is located, the azimuth partition where the neighborhood point $p_i$ is located, and the first deviation partition into which a first axial angle $\alpha$ between a normal vector $n_i$ of the neighborhood point $p_i$ and the z axis falls; and
generating a corresponding radial distribution histogram, a corresponding azimuth distribution histogram, and a corresponding first deviation distribution histogram respectively for the 3D point set P within the spherical neighborhood to characterize the 3D local surface information within the spherical neighborhood,
wherein the plurality of first deviation partitions of the spherical neighborhood are non-uniformly divided, and the first deviation angle is divided more densely where it is closer to the positive direction of the z axis, and
wherein the first angle $\theta_z$ is non-uniformly divided through establishing a sine function $2\sin(\theta/2)$ about $\theta$ and dividing amplitude of the sine function non-uniformly, where $\theta \in \}0, \theta_z\}$.

7. The 3D shape matching method according to claim 6, wherein the method further comprises:
dividing an elevation angle of the spherical neighborhood into a plurality of elevation partitions with the origin of the spherical neighborhood as the center;
determining the elevation partition where the neighborhood point $p_i$ is located; and
generating a corresponding elevation distribution histogram for the 3D point set P within the spherical neighborhood, and characterizing the 3D local surface information within the spherical neighborhood by using the radial distribution histogram, the azimuth distribution histogram, the elevation distribution histogram and the first deviation distribution histogram.

8. The 3D shape matching method according to claim 7, wherein the method further comprises:
dividing a second angle $\theta_x$, formed by using the x axis as a starting axis and using the x axis as an ending axis on a x-p-y plane, into a plurality of second deviation partitions, where $\theta_x = 2\pi$;
determining the second deviation partition into which a second axial angle $\beta$ between a projected vector of the normal vector $n_i$ of the neighborhood point $p_i$ on the x-p-y plane and the x axis falls; and
generating a corresponding second deviation distribution histogram for the 3D point set P within the spherical neighborhood, and characterizing the 3D local surface information within the spherical neighborhood by using the radial distribution histogram, the azimuth distribution histogram, the elevation distribution histogram, the first deviation distribution histogram and the second deviation distribution histogram.

9. The 3D shape matching method according to claim 8, wherein the steps of generating the corresponding histograms comprise at least one of:
respectively assigning weights $w_1^R$ and $w_2^R$ to contribution values that the neighborhood point $p_i$ contributes to two adjacent radial partitions closest to the neighborhood point $p_i$, accumulating the contribution values that the 3D point set P contributes to each of the radial partitions, and generating the corresponding radial distribution histogram, where $w_1^R \in [0,1]$, $w_2^R \in [0,1]$, $w_1^R + w_2^R = 1$;
respectively assigning weights $w_1^A$ and $w_2^A$ to contribution values that the neighborhood point $p_i$ contributes to two adjacent azimuth partitions closest to the neighborhood point $p_i$, accumulating the contribution values that the 3D point set P contributes to each of the azimuth partitions, and generating the corresponding azimuth distribution histogram, where $w_1^A \in [0,1]$, $w_2^A \in [0,1]$, and $w_1^A + w_2^A = 1$;
respectively assigning weights $w_1^E$ and $w_2^E$ to contribution values that the neighborhood point $p_i$ contributes to two elevation partitions closest to the neighborhood point $p_i$, accumulating the contribution values that the 3D point set P contributes to each of the elevation partitions, and generating the corresponding elevation distribution histogram, where $w_1^E \in [0,1]$ $w_2^E \in [0,1]$, and $w_1^E + w_2^E = 1$;

respectively assigning weights $w_1^\alpha$ and $w_2^\alpha$ to contribution values that the neighborhood point $p_i$ contributes to two adjacent first deviation partitions closest to the neighborhood point $p_i$, accumulating the contribution values that the 3D point set P contributes to each of the first deviation partitions, and generating the corresponding first deviation distribution histogram, where $w_1^\alpha \in [0,1]$ $w_2^\alpha \in [0,1]$, and $w_1^\alpha + w_2^\alpha = 1$;

respectively assigning weights $w_1^\beta$ and $w_1^\beta$ to contribution values that the neighborhood point $p_i$ contributes to two second deviation partitions closest to the neighborhood point $p_i$, accumulating the contribution values that the 3D point set P contributes to each of the second deviation partitions, and generating the corresponding second deviation distribution histogram, where $w_1^\beta \in [0,1]$ $w_2^\beta \in [0,1]$ and $w_1^\beta + w_2^\beta = 1$.

10. The 3D shape matching method according to claim 9, wherein the weights $w_1^R$ and $w_2^R$ are inversely proportional to distances from the neighboring point $p_i$ to the centroids of the two adjacent radial partitions respectively, the weights $w_1^A$ and $w_2^A$ are inversely proportional to distances from the neighboring point $p_i$ to the centroids of the two adjacent azimuth partitions respectively, the weights $w_1^E$ and $w_2^E$ are inversely proportional to distances from the neighboring point $p_i$ to the centroids of the two adjacent elevation partitions respectively, the weights $w_1^\alpha$ and $w_2^\alpha$ are inversely proportional to distances from the neighboring point $p_i$ to the centroids of the two adjacent first deviation partitions respectively, and the weights $w_1^\beta$ and $w_2^\beta$ are inversely proportional to distances from the neighboring point $p_i$ to the centroids of the two adjacent second deviation partitions respectively.

11. A 3D shape matching device based on 3D local feature description using SGHs, comprising an acquisition apparatus, a memory and a processor, wherein the acquisition apparatus is configured to acquire a 3D point cloud of a real scene, a computer program is stored in the memory, and the processor, when executing the computer program, implements the steps of:

acquiring a feature point p of the 3D point cloud of the real scene;

establishing a local reference frame for a spherical neighborhood of the feature point p, wherein an origin of the spherical neighborhood coincides with the feature point p and the spherical neighborhood has a support radius of R, and an origin of the local reference frame coincides with the feature point p and the local reference frame have an orthogonal and normalized x axis, y axis, and z axis;

establishing a 3D local feature descriptor based on the local reference frame to encode spatial information within the spherical neighborhood so as to acquire 3D local surface information within the spherical neighborhood; and matching the 3D local surface information within the spherical neighborhood with 3D local surface information of a target object to perform 3D shape matching;

wherein the step of establishing the 3D local feature descriptor based on the local reference frame to encode spatial information within the spherical neighborhood comprises:

dividing the spherical neighborhood into a plurality of radial partitions along a radial direction with the origin of the spherical neighborhood as a center;

dividing the spherical neighborhood into a plurality of azimuth partitions with the z axis as a central axis, dividing a first angle $\theta_z$ between a negative direction of the z axis and a positive direction of the z axis into a plurality of first deviation partitions with the origin of the spherical neighborhood as the center, where $\theta_z = \pi$;

acquiring a 3D point set P within the spherical neighborhood, wherein P={$p_i$|i=1, 2, 3, . . . , n}, $p_i$ is a neighborhood point within the spherical neighborhood, and n is the number of neighborhood points within the spherical neighborhood;

determining the radial partition where the neighborhood point $p_i$ is located, the azimuth partition where the neighborhood point $p_i$ is located, and the first deviation partition into which a first axial angle $\alpha$ between a normal vector n of the neighborhood point $p_i$ and the z axis falls; and generating a corresponding radial distribution histogram, a corresponding azimuth distribution histogram, and a corresponding first deviation distribution histogram respectively for the 3D point set P within the spherical neighborhood to characterize the 3D local surface information within the spherical neighborhood, wherein the plurality of first deviation partitions of the spherical neighborhood are non-uniformly divided, and the first deviation angle is divided more densely where it is closer to the positive direction of the z axis, and wherein the processor, when executing the computer program, further implements the steps of:

dividing an elevation angle of the spherical neighborhood into a plurality of elevation partitions with the origin of the spherical neighborhood as the center;

determining the elevation partition where the neighborhood point $p_i$ is located; and generating a corresponding elevation distribution histogram for the 3D point set P within the spherical neighborhood, and characterizing the 3D local surface information within the spherical neighborhood by using the radial distribution histogram, the azimuth distribution histogram, the elevation distribution histogram and the first deviation distribution histogram.

12. The 3D shape matching device according to claim 11, wherein the processor, when executing the computer program, further implements the steps of:

dividing a second angle $\theta_x$, formed by using the x axis as a starting axis and using the x axis as an ending axis on a x-p-y plane, into a plurality of second deviation partitions, where $\theta_x = 2\pi$;

determining the second deviation partition into which a second axial angle $\beta 0$ between a projected vector of the normal vector n of the neighborhood point $p_i$ on the x-p-y plane and the x axis falls; and generating a corresponding second deviation distribution histogram for the 3D point set P within the spherical neighborhood, and characterizing the 3D local surface information within the spherical neighborhood by using the radial distribution histogram, the azimuth distribution histogram, the elevation distribution histogram, the first deviation distribution histogram and the second deviation distribution histogram.

13. The 3D shape matching device according to claim 12, wherein the steps of generating the corresponding histograms comprise at least one of:

respectively assigning weights $w_1^R$ and $w_2^R$ to contribution values that the neighborhood point $p_i$ contributes to two adjacent radial partitions closest to the neighborhood point $p_i$, accumulating the contribution values that the 3D point set P contributes to each of the radial partitions, and generating the corresponding radial distribution histogram, where $w_1^R \in [0,1]$, $w_2^R \in [0,1]$, $w_1^R + w_2^R = 1$;

respectively assigning weights $w_1^A$ and $w_2^A$ to contribution values that the neighborhood point $p_i$ contributes to two adjacent azimuth partitions closest to the neighborhood point $p_i$, accumulating the contribution values that the 3D point set P contributes to each of the azimuth partitions, and generating the corresponding azimuth distribution histogram, where $w_1^A \in [0,1]$, $w_2^A \in [0,1]$, and $w_1^A + w_2^A = 1$;

respectively assigning weights $w_1^E$ and $w_2^E$ to contribution values that the neighborhood point $p_i$ contributes to two elevation partitions closest to the neighborhood point $p_i$, accumulating the contribution values that the 3D point set P contributes to each of the elevation partitions, and generating the corresponding elevation distribution histogram, where $w_1^E \in [0,1]$ $w_2^E \in [0,1]$, and $w_1^E + w_2^E = 1$;

respectively assigning weights $w_1^\alpha$ and $w_2^\alpha$ to contribution values that the neighborhood point $p_i$ contributes to two adjacent first deviation partitions closest to the neighborhood point $p_i$, accumulating the contribution values that the 3D point set P contributes to each of the first deviation partitions, and generating the corresponding first deviation distribution histogram, where $w_1^\alpha \in [0,1]$ $w_2^\alpha \in [0,1]$, and $w_1^\alpha + w_2^\alpha = 1$;

respectively assigning weights $w_1^\beta$ and $w_1^\beta$ to contribution values that the neighborhood point $p_i$ contributes to two second deviation partitions closest to the neighborhood point $p_i$, accumulating the contribution values that the 3D point set P contributes to each of the second deviation partitions, and generating the corresponding second deviation distribution histogram, where $w_1^\beta \in [0,1]$ $w_2^\beta \in [0,1]$ and $w_1^\beta + w_2^\beta = 1$.

14. The 3D shape matching device according to claim 13, wherein the weights $w_1^R$ and $w_2^R$ are inversely proportional to distances from the neighboring point $p_i$ to the centroids of the two adjacent radial partitions respectively, the weights $w_1^A$ and $w_2^A$ are inversely proportional to distances from the neighboring point $p_i$ to the centroids of the two adjacent azimuth partitions respectively, the weights $w_1^E$ and $w_2^E$ are inversely proportional to distances from the neighboring point $p_i$ to the centroids of the two adjacent elevation partitions respectively, the weights $w_1^\alpha$ and $w_2^\alpha$ are inversely proportional to distances from the neighboring point $p_i$ to the centroids of the two adjacent first deviation partitions respectively, and the weights $w_1^\beta$ and $w_2^\beta$ are inversely proportional to distances from the neighboring point $p_i$ to the centroids of the two adjacent second deviation partitions respectively.

\* \* \* \* \*